Nov. 3, 1942.　　　G. D. BEHLEN　　　2,301,156

VENTILATION SYSTEM FOR PORTABLE POWER TOOLS

Filed March 4, 1940　　　3 Sheets-Sheet 1

INVENTOR
George D. Behlen
BY Albert Latta
ATTORNEY

Nov. 3, 1942.  G. D. BEHLEN  2,301,156
VENTILATION SYSTEM FOR PORTABLE POWER TOOLS
Filed March 4, 1940  3 Sheets-Sheet 2

INVENTOR
George D. Behlen
BY Albert Latta
ATTORNEY

Nov. 3, 1942.   G. D. BEHLEN   2,301,156
VENTILATION SYSTEM FOR PORTABLE POWER TOOLS
Filed March 4, 1940   3 Sheets-Sheet 3
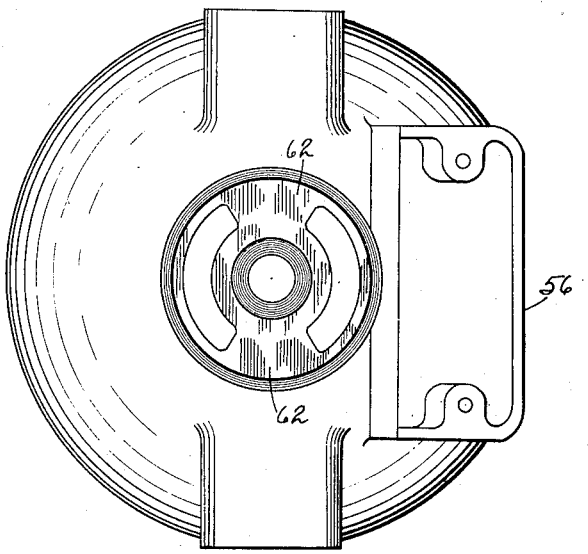
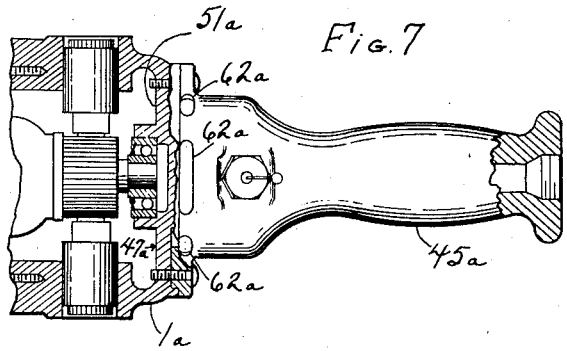
INVENTOR
George D. Behlen
BY Albert Latta
ATTORNEY Patented Nov. 3, 1942

2,301,156

UNITED STATES PATENT OFFICE 2,301,156

VENTILATION SYSTEM FOR PORTABLE POWER TOOLS

George D. Behlen, Chicago, Ill.

Application March 4, 1940, Serial No. 322,204

3 Claims. (Cl. 172—36)

My invention relates to electric motor driven portable power tools.

The invention relates more specifically to an improved air cooling system for the electric motor and associated parts.

Heretofore in the construction of portable sanders and polishers and other similar portable electric motor driven tools, it has been the common practice to provide air vents in the rear end wall of the motor housing closely adjacent the brush-holders. As a consequence thereof it was impracticable if not impossible to prevent the incoming air from striking the brushes and brush-holders. As a result of this condition the dust particles and other foreign matter, which is ever present in normal atmosphere and which is increasingly so present in the atmosphere in which the tools are normally operated, accumulates against the brushes and brush-holders. The consequence of this accumulation of foreign material against the brushes and brush-holders is several fold. Of primary significance is the fact that as the dust continues to pile up against the sides of the brushes, eventually it establishes an electrical connection between the brushes and the metal housing causing a grounding of the electric current to the housing. This condition is dangerous and has caused loss of human lives. This accumulation of dust also expedites the demolition of the brush holders which insulate the brushes from the housing. This condition results from small electrical arcs being set up between the dust particles, causing a burning of the insulation. When the insulation is destroyed a direct electrical connection between the brushes and the housing is set up and the current is grounded to the housing.

The danger of having the current grounded to the housing is emphasized by the fact that the operators are frequently neglectful about connecting the ground wire to a suitable grounding medium, such as a water pipe, and consequently the current which is grounded to the housing is transmitted through the operator's body instead of through the ground wire.

A primary object of my invention is to provide a baffling means for directing the flow of air current around the motor brushes and brush-holders to prevent accumulation of dust particles in the region thereof.

Another primary object is to locate the air inlet vents at the outer end of an elongated handle whereby a cooling of the handle is effected as the air current is drawn through the handle. An important aspect of using this location for the air inlet vents is to reduce to a minimum the amount of dust particles which enter the motor housing.

Other objects and advantages will be apparent upon reading the specification and the accompanying drawings forming a part of the specification, in which:

Fig. 6 is an enlarged end view of the motor housing from the rear; and

Fig. 7 is a slight modification of the invention showing a different type of handle construction in which the air inlet vents are at the forward end of the handle.

Figure 1:
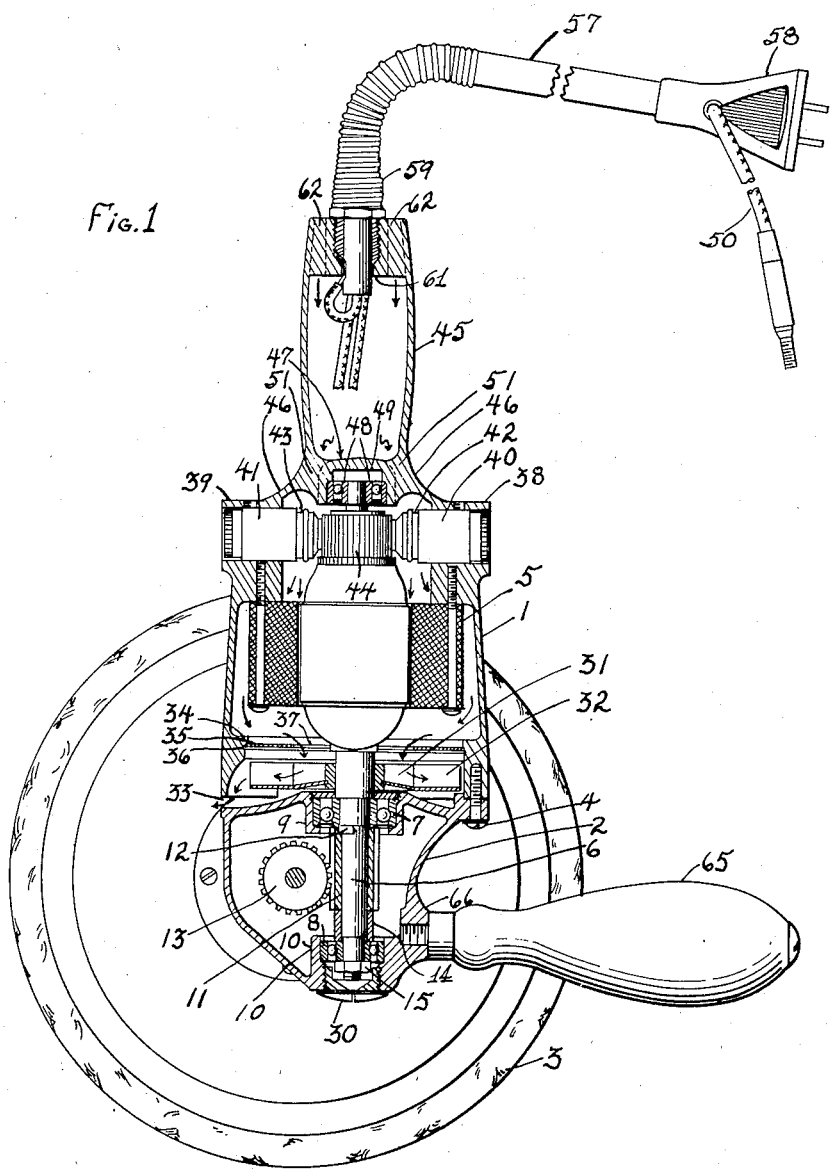
Fig. 1 is a sectional plan view of my improved sanding and polishing device.
Figure 2:
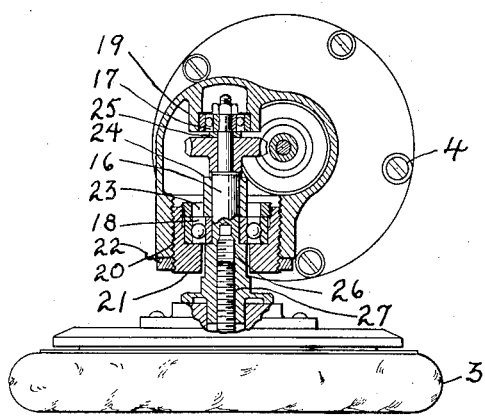
Fig. 2 is a front elevation showing the gear housing in section.

In general my invention comprises a motor housing 1 having an electric motor mounted therein. A gear housing 2 is secured to the motor housing having a worm gear and a worm wheel therein which drive a disc type polishing or sanding pad 3.

In the preferred embodiment of my invention, I have shown the motor housing 1 with the gear housing 2 secured by means of screws 4. The electric motor 5 is of the universal type and may be operated on either A. C. or D. C. current. One end of the armature shaft 6 extends into the gear housing and is journaled in bearings 7 and 8, which are received in bearing retainers 9 and 10 formed integrally with the gear housing. The worm gear 11 is keyed to the armature shaft at 12 and drives the worm wheel 13 thus providing the necessary speed reduction required for a tool of this type.

A suitable spacer sleeve 14 in combination with the worm gear serves to retain the bearings in position. At the free end of the armature shaft 6 a threaded region receives a nut 15 which serves as a retainer for bearing 8. The nose of the gear housing is provided with a threaded bore adapted to receive the screw 30. The purpose of screw 30 is to facilitate assembling of the parts in the gear housing. The worm wheel 13 is keyed to the spindle shaft 16 which extends vertically through the gear housing. The spindle shaft 16 is journaled in bearings 17 and 18. A boss 19 formed integrally with the gear housing serves as a bearing retainer for the bearing 17. The lower region of the gear housing is formed with a threaded bore 20 adapted to receive a corresponding threaded bearing retainer nut 21. A lock nut 22 secures the bearing retainer nut 21 in the desired position. A second lock nut 23 retains bearing 18 in place. Spacer sleeves 24 and 25 serve to maintain the bearings 17 and 18 and the worm wheel 13 in their desired relative positions.

The free end of the spindle shaft has an axially threaded bore 26 adapted to receive threaded bolt 27 which secures the polishing or sanding pad 3 to the spindle shaft. A handle 65 adapted to be gripped by one hand of the operator is screw-threadedly secured to a boss 66 formed integrally with the gear housing.

At the open end of the motor housing a fan compartment receives a suction type fan secured to the armature shaft and having an open or unbladed central region 31 into which the air is directed and thence drawn into the bladed region 32 of the fan and out through the opening 33 defined between the motor housing and gear housing. An annular flange 34 is formed integrally with the motor housing and is provided with a recession adapted to receive an annular baffle plate 35 and a wire ring 36 which locks the baffle plate in place. The baffle plate diverts the direction of flow of the air current and directs the air through the opening defined between the armature shaft and the inner periphery of the baffle plate.

At the rear end of the motor housing 1 a pair of diametrically opposed bosses 38 and 39 are formed integrally with the side walls of the housing having bores therein for receiving the Bakelite brush holders 40 and 41. Suitable brushes 42 and 43 yieldingly engage the external surface of the commutator 44. The rear walls of the motor houshing converge inwardly at 46 and then continue longitudinally to form an elongated hollow handle 45. Internally of the motor housing at the region 46 where the walls of the motor housing converge inwardly, a web 47 extends transversely of the housing and is formed integrally therewith. The central region of the web defines a cup-like retainer 49 adapted to receive the bearings 48 for the commutator and of the armature shaft 6.

Extending between the cup-like bearing retainer 49 and the walls of the housing are the bridge portions 51 which serve to support the bearing retainer 49 and also to provide the shielding means for the brushes and brush holders. These shielding means or bridge portions 51 direct the flow of air current around the brushes and brush holders and it can be seen that the dust particles are thereby prevented from accumulating against the same. The bridge portions or baffle members 51 are formed integrally with the housing walls.

Figure 4:
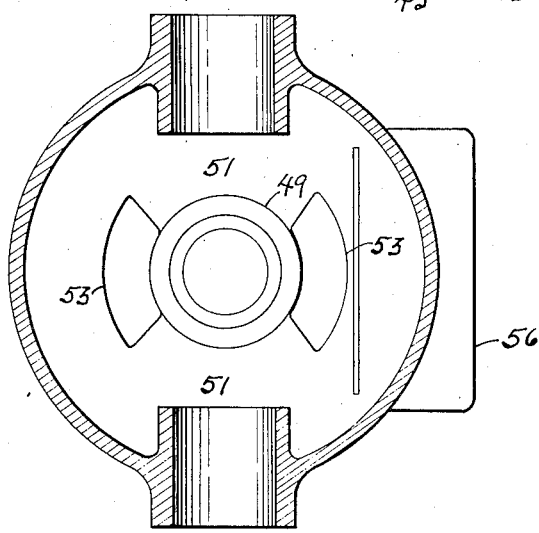
Fig. 4 is an enlarged sectional view taken on line 4—4 of Fig. 3, but with the housing turned 90° about its axis.

By referring to Fig. 4 it can be seen that the transverse surface area of the baffle members or bridge portions 51 is greater than the diameter of the brush-holders, thereby assuring a complete obstruction to the flowing of the air current against the brush-holders.

As the air current is drawn through the handle 45 it flows through the openings 53 in the web 47. The flowing air current which would normally have struck against the brushes and brush-holders, instead strikes against the bridge portions or baffle members 51 of the web and the dust particles accumulate here rather than against the brushes and brush-holders. The accumulation of the dust against the bridge portions 51 of the web has no injurious effect upon the operation or maintenance of the tool.

Figure 5:
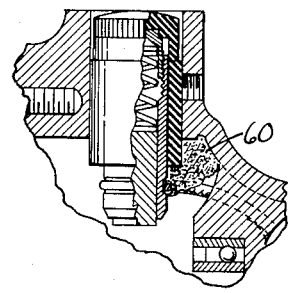
Fig. 5 is a diagrammatic fragmentary view through one of the brush holders showing where the dust particles ordinarily accumulate between the brush and the motor housing.
Figure 3:
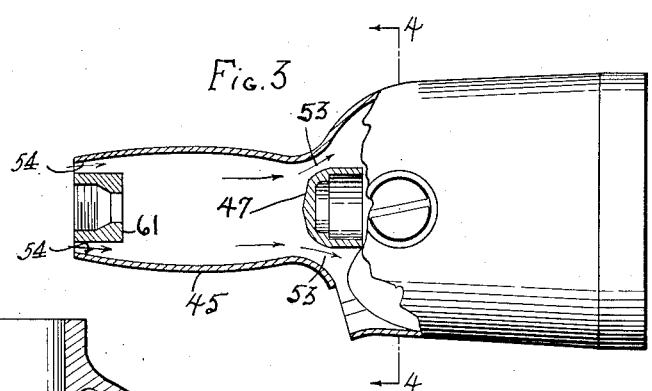
Fig. 3 is a side elevation of the motor housing shown partly in section.

In Fig. 5 I have shown diagrammatically how the dust 60 would accumulate between the brushes and the housing if the brushes were not protected by some covering means.

At the outer end of the handle 45 I have provided inlet vents 54 and it can be seen that the air flowing through the handle is flowing in a direction substantially aligned with the motor axis and cools the handle and counteracts any heat which may be transmitted into the handle from the bearings 48. By locating the vents 54 at the outer end of the handle I have reduced to a minimum the amount of dust which can enter the tool. This is achieved by the fact that the inlet vents 54 are located a maximum distance from the working end of the tool, where the dust created by the tool is most concentrated. When the sanding disc or pad 3 is rotated, the dust created thereby is thrown off parallel to the pad, due to centrifugal force. The dust travels in this parallel line until the effect of the centrifugal force is overcome by the force of gravity and by the resistance set up by the atmosphere, then the particles of dust settle toward earth. The farther away the inlet vents are from the path of travel of this dust, the less dust there is that can be drawn into the tool.

At the rear of the motor housing 1 and on the upper side thereof a switch box 56 is formed integrally therewith. A suitable electric conductor cable 57 extends from the end of the handle 45 and has a plug-in 58. A coiled protector spring 59 is wound around the cable near the handle. A threaded insert 61, formed integrally with the handle 45, through the medium of the web portions 62 extending transversely between the walls of the handle and the insert 61, is adapted to receive and support the conductor cable 57.

In the modification of the invention shown in Fig. 7 I have provided a handle 45a which is detachably secured to the motor housing 1a. I have located the air inlet vents 62a in the forward region of the handle and on the upper side only. The shielding members for the brush-holders are formed integrally with the motor housing and as a part of the web 47a which extends transversely of the housing.

Although I have shown my invention as being adapted to a sanding and polishing tool, it is apparent that it can be readily adapted to any type of portable electric motor driven tool and it is intended that it should be so adapted.

Having thus described my invention what I claim is:

1. In a portable power driven tool, a motor housing having an electric motor therein, a pair of brush-holders supported in the walls of said housing substantially opposed to each other and near one end of the housing, a handle extending from one end of the housing in substantial longitudinal alignment with the motor housing, said handle having air inlet vents at its free end, these inlet vents being the sole vents for admission of air into the tool, thereby causing the air stream to travel at all times in a path substantially longitudinally of the handle and motor housing, a web portion interposed between the inner end of the handle and the motor housing and extending transversely of said housing, said web portion having spaced air vents extending therethrough and also forming a shielding means for said brush-holders, said shielding means having a surface area at least as great as the width of the brush-holders and said shielding means being in alignment with and adjacent said brush-holders, whereby air currents are directed around and past the brush-holders, but not in contact therewith.

2. In a portable power driven tool, a housing, an electric motor therein, a plurality of brush-holders supported in the walls of the housing and spaced from each other, brushes associated with said brush-holders, a handle extending outwardly from one end of the housing in substantial longitudinal alignment therewith, said handle having air inlet vents at its free end, these inlet vents being the sole vents for admission of air into the tool, thereby causing the air stream to travel at all times in a path substantially longitudinally of the handle and motor housing, a fan at the end of the housing away from the handle for drawing a continuous stream of air through the handle and housing and means within the housing and extending transversely thereof for directing the air stream around and past the brushes and brush-holders but not in contact therewith, said means being spaced adjacent the brush-holders and in alignment therewith, and said means having a surface area of at least as extensive as the width of the brush-holders.

3. In a portable power driven tool, a motor housing, a motor and brush-holders therein, a handle extending from one end of the motor housing in substantial longitudinal alignment therewith, air inlet vents at the free end of the handle, these inlet vents being the sole vents for admitting air into the tool, thereby causing the air currents to travel at all times in a path substantially longitudinally of the handle and motor housing, outlet vents at the end of the motor housing away from the handle, means disposed between the inlet and outlet vents for shielding the brush-holders so as to prevent the air currents from coming into contact therewith, said means including a web portion extending transversely across the motor housing, the web portion having air passages therein, and also having sheathing portions adjacent the brush-holders and in alignment therewith, the sheathing portions of the web having surface areas substantially greater than the width of the brush-holders, thereby preventing the passing stream of air from coming into contact with the brush-holders.

GEORGE D. BEHLEN.